(12) United States Patent
Falcon et al.

(10) Patent No.: US 6,295,556 B1
(45) Date of Patent: *Sep. 25, 2001

(54) METHOD AND SYSTEM FOR CONFIGURING COMPUTERS TO CONNECT TO NETWORKS USING NETWORK CONNECTION OBJECTS

(75) Inventors: Stephen R. Falcon, Woodinville; Michael C. Miller, Redmond, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,666

(22) Filed: Nov. 18, 1997

(51) Int. Cl.[7] .................................................. G06F 13/00
(52) U.S. Cl. .................... 709/220; 709/221; 709/222; 709/223; 709/224; 709/225; 709/205; 709/7; 709/9; 709/13
(58) Field of Search .................................... 709/220–225, 709/205; 707/9, 10, 103

(56) References Cited

U.S. PATENT DOCUMENTS

| 5,557,748 | * | 9/1996 | Norris | 395/200.52 |
| 5,838,907 | * | 11/1998 | Hansen | 395/200.5 |
| 6,003,068 | * | 12/1999 | Sopko | 709/205 |
| 6,026,410 | * | 2/2000 | Allen et al. | 707/10 |

FOREIGN PATENT DOCUMENTS

| 0281102 | 9/1988 | (EP) . |
| 0801354 | 10/1997 | (EP) . |
| WO 95/17064 | 6/1995 | (WO) . |

OTHER PUBLICATIONS

"Introduction to Windows 95 Networking," *Microsoft Windows®95 Resource Kit*, Chapter 7, Microsoft Press, pp. 249–262 (1995).
Red Hat Software, Inc., "Red Hat Linux 5.0, The Official Red Hat Linux Installation Guide," Oct. 1997, http://www.redhat.com/corp/support/manuals/archive/rhl–5.0–installation–guide–html/rhl–5.0–installation–guidps.gz downloaded May 21, 1999.
Copy of International Search Report in Corresponding PCT Application PCT/US98/24432.

\* cited by examiner

Primary Examiner—Dung C. Dinh
Assistant Examiner—Hieu C. Le
(74) Attorney, Agent, or Firm—Michalik & Wylie, PLLC

(57) ABSTRACT

A method and system for configuring computers to connect to networks using network connection objects. For each connection to a network, configuration information for connecting to that network is maintained within a connection object. Such configuration information may include device, protocol, and other computer and network property information along with binding information therefor. Connection objects may be stored as files or the like independent of a running network configuration, and be applied to the running configuration to change the network configuration. Also included is a process to reconcile networking components identified in a connection object with those available on a given system.

29 Claims, 12 Drawing Sheets

METHOD AND SYSTEM FOR CONFIGURING COMPUTERS TO CONNECT TO NETWORKS USING NETWORK CONNECTION OBJECTS

FIELD OF THE INVENTION

The present invention relates generally to computers and computer networks, and more particularly to an improved method and system for connecting computers to computer networks.

BACKGROUND OF THE INVENTION

Computer users are interacting with networks on an ever-increasing basis. However, setting up a computer to connect to a network can be a daunting task, as in order to set up a connection, a user presently needs to work with a highly technical user interface that requires the user to understand a networking implementation model. In general, to configure a computer for networking, a computer user needs to manually modify discrete network configuration options, typically installing, binding and setting property values of a protocol stack of networking components. At the same time, implementation constructs such as "adapters," "protocols," "services" and "bindings" fail to inform the user what purpose they serve, and are therefore mostly incomprehensible or at least extremely intimidating to an average user.

Nevertheless, to properly configure a computer for connecting to a network, a user has to select the correct option for each, which at times may vary depending on the setting of another option. For example, a particular protocol may have to be used with a particular type of client software. As a result, the manual, direct configuration of networking parameters is prone to a substantial amount of user error, and support calls for assistance on network configuration are many and long.

Moreover, computer networking presently assumes a static networking configuration that is established once and used thereafter without change. However, this model has inherent drawbacks as computers are increasingly required to interact differently with networks based upon changing network topologies, changing computer locations, changes in user demands and so on. For example, a user may connect to a Local Area Network (LAN) at the office, and to a Wide Area Network (WAN) at home. If using the same physical computer at both locations, the user needs to reconfigure that computer each time the other type of connection is to be made. Even if not using the same physical computer, the user is presented with wholly independent and unique user interfaces for each type of connection, further compounding the already difficult configuration process.

OBJECTIVES AND SUMMARY OF THE INVENTION

Accordingly, it is an objective of the present invention to provide a system and method that simplifies network configuration.

In accomplishing that objective, it is a related objective to replace the static network configuration model with a model of networking that is connection-based.

Another objective is to provide a method and system as characterized above that enables the user to configure a connection to a selected network in a substantially less complex manner.

Yet another objective is to provide a user interface that presents differing networking methods in a heterogeneous way.

Still another objective is to provide a method and system of the above kind that allows a user to easily alter a network configuration of a computer with less chance of error.

Another objective is to provide a method and system that automatically reconciles selected configuration options with actual components available on a particular computer system.

Briefly, the present invention provides a method and system of configuring a computer to connect to different networks. A user interface is provided for receiving input from the user, the input identifying a network and its configuration information. The configuration information is independently saved for each different network by writing the information into a data structure maintained in a non-volatile storage, such as by independently storing object class information and parameter data in a file of a file system for each network connection.

To connect the computer to a selected network, the configuration information is retrieved from the data structure corresponding to the selected network, and the connection is made by applying the retrieved information and parameter values to the system's running configuration. A process is also provided to reconcile network components described in the connection object with the network components actually present on the computer system.

Other objects and advantages will become apparent from the following detailed description when taken in conjunction with the drawings, in which:

DETAILED DESCRIPTION OF THE PREFERRED EMBODIMENT

Exemplary Operating Environment

Figure 1:
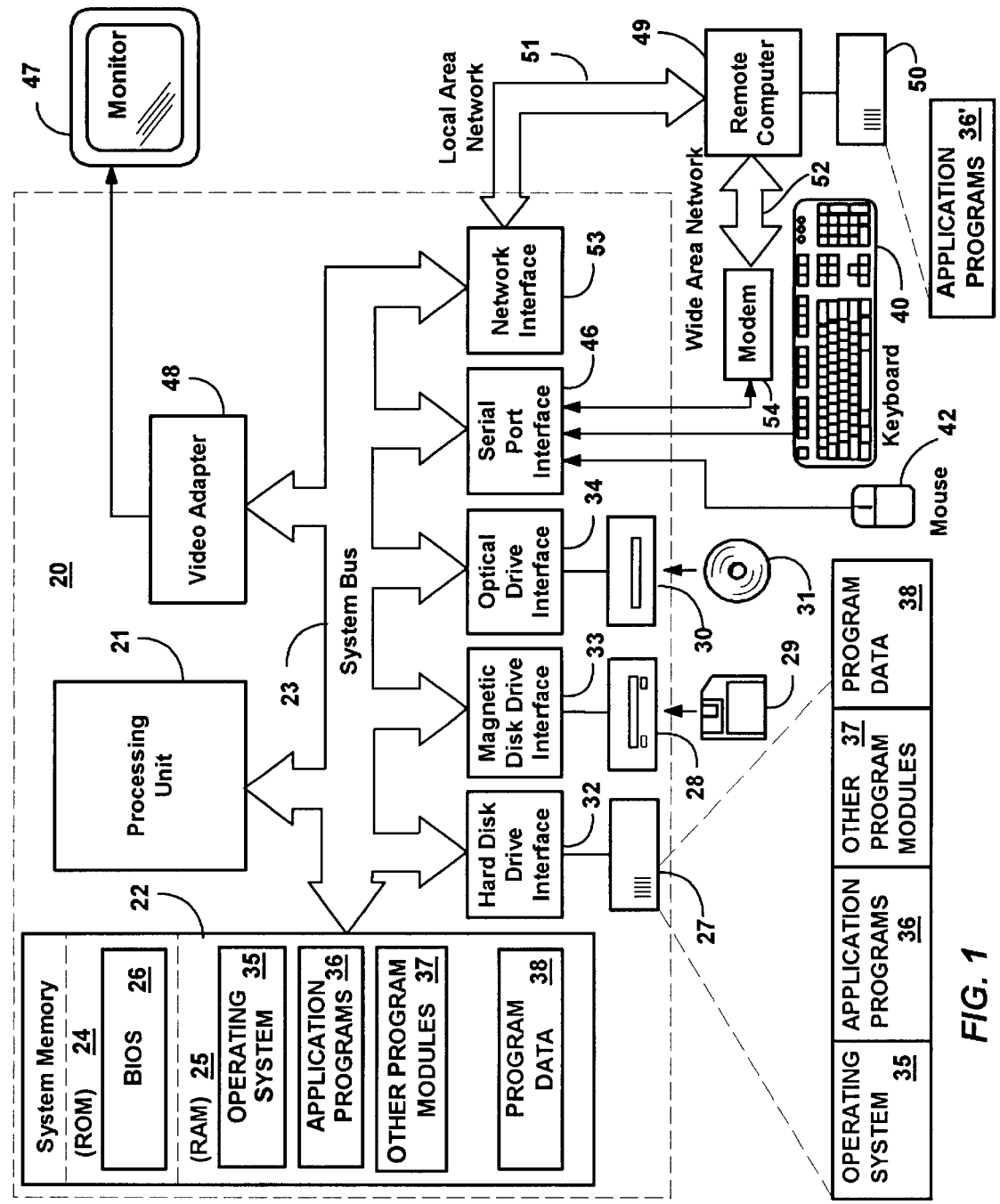
FIG. 1 is a block diagram representing a computer system into which the present invention may be incorporated.

FIG. 1 and the following discussion are intended to provide a brief general description of a suitable computing environment in which the invention may be implemented.

Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (which may be considered as including a file system therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 is to be configured to operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. For purposes of the present invention, the above-identified computer system 20 may serve as a local device that a user desires to connect to another computer system, particularly a network.

Figure 2:
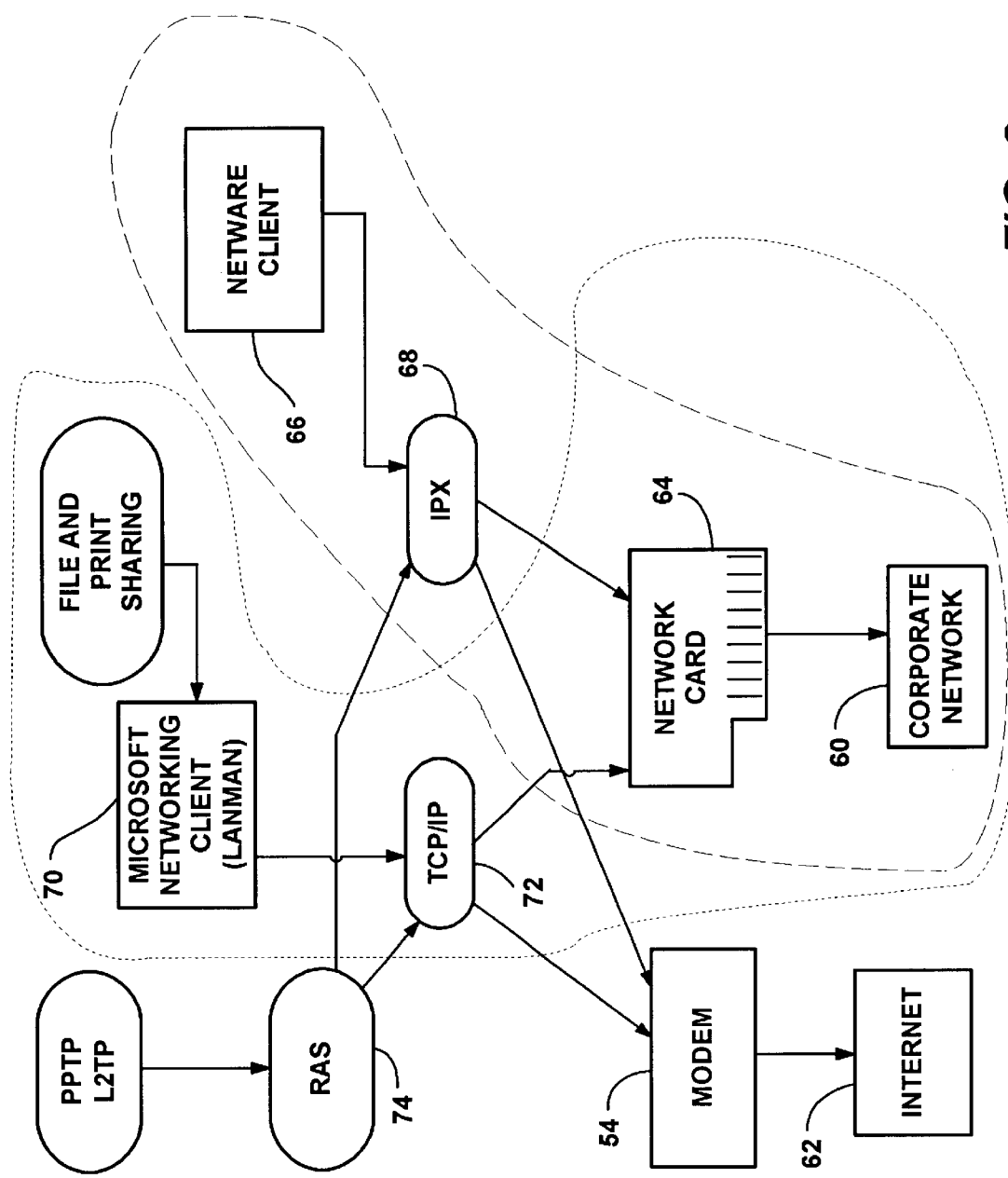
FIG. 2 is a block diagram exemplifying a number of ways to connect a computer to networks.

FIG. 2 exemplifies a number of ways in which a computer may connect to various networks 60, 62. As represented by the components encompassed within in the dashed line of FIG. 2, a user may connect the system 20 through a network card 64 to a network 60 (e.g., a corporate network) as a Netware client 66 using IPX as the protocol 68. Alternatively, as represented by the components encompassed within the dotted line of FIG. 2, a user may connect the system 20 to the same corporate network 60 using the same network card 64, but as a Microsoft Networking client 70 via the TCP/IP protocol 72.

Moreover, the user's system 20 may connect through the modem 54 to the Internet 62 via a remote access server (RAS) 74 and the TCP/IP protocol 72. Alternatively, the user can connect to the Internet 62 through the modem 54 and either the Microsoft Networking client 70 and TCP/IP protocol 72 or the Netware client 66 and IPX protocol 68. As can be readily appreciated, many other devices, protocols, services, networking software and so on may be bound to one another for connecting to a network.

Figure 3:
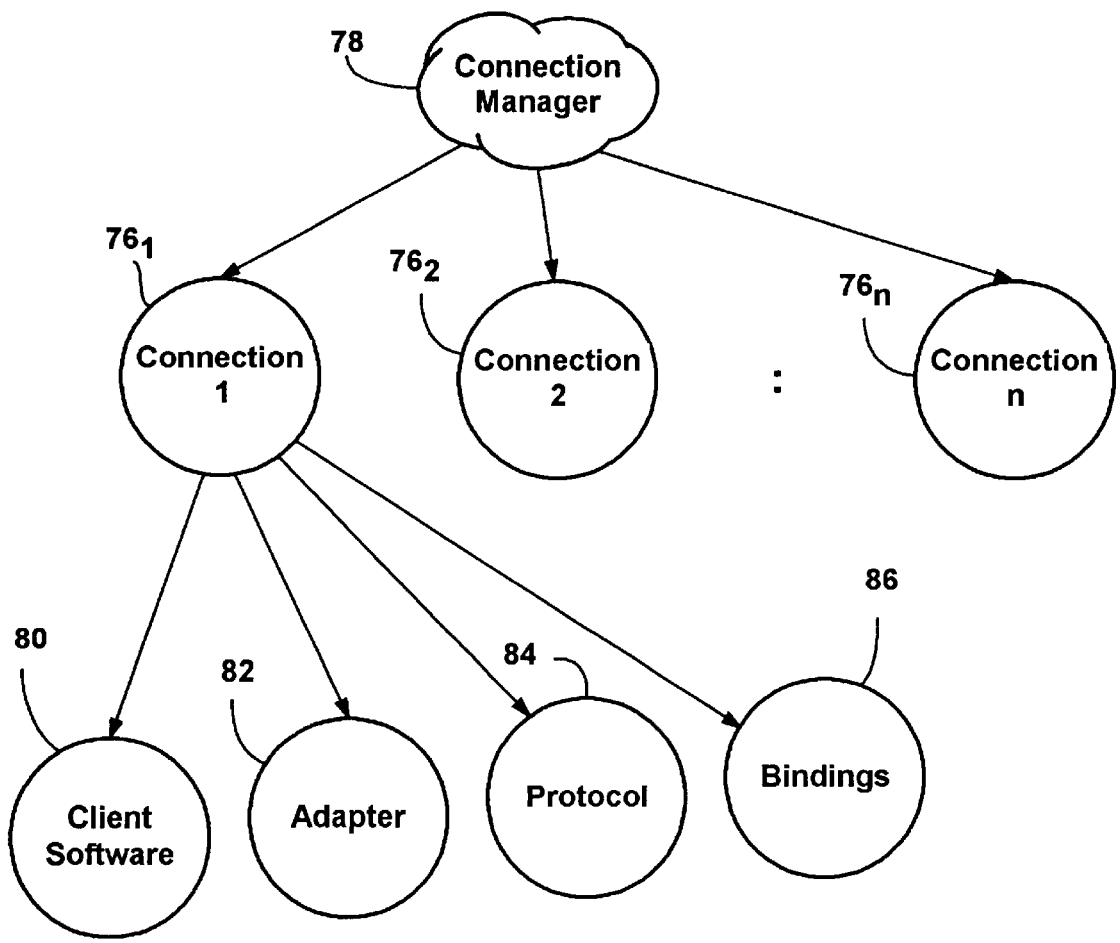
FIG. 3 is a conceptual representation of connection objects for maintaining configuration information in accordance with one aspect of the present invention.

In accordance with one aspect of the present invention and as conceptually represented in FIG. 3, instead of modifying network settings, a user generates a connection object $76_1$–$76_n$ for each combination of networking components (e.g., devices, protocols, binding information and so on) that corresponds to a connection to another computer, i.e., for each network connection. In general, a connection object represents a link supporting features between the users computer and other entity, i.e., each connection object $76_1$–$76_n$ comprises a self-contained description of the networking configuration required to connect to a particular network. For example, the connection object $76_1$ identifies client software information 80, adapter information 82, protocol information 84 and binding information 86.

Figure 4:
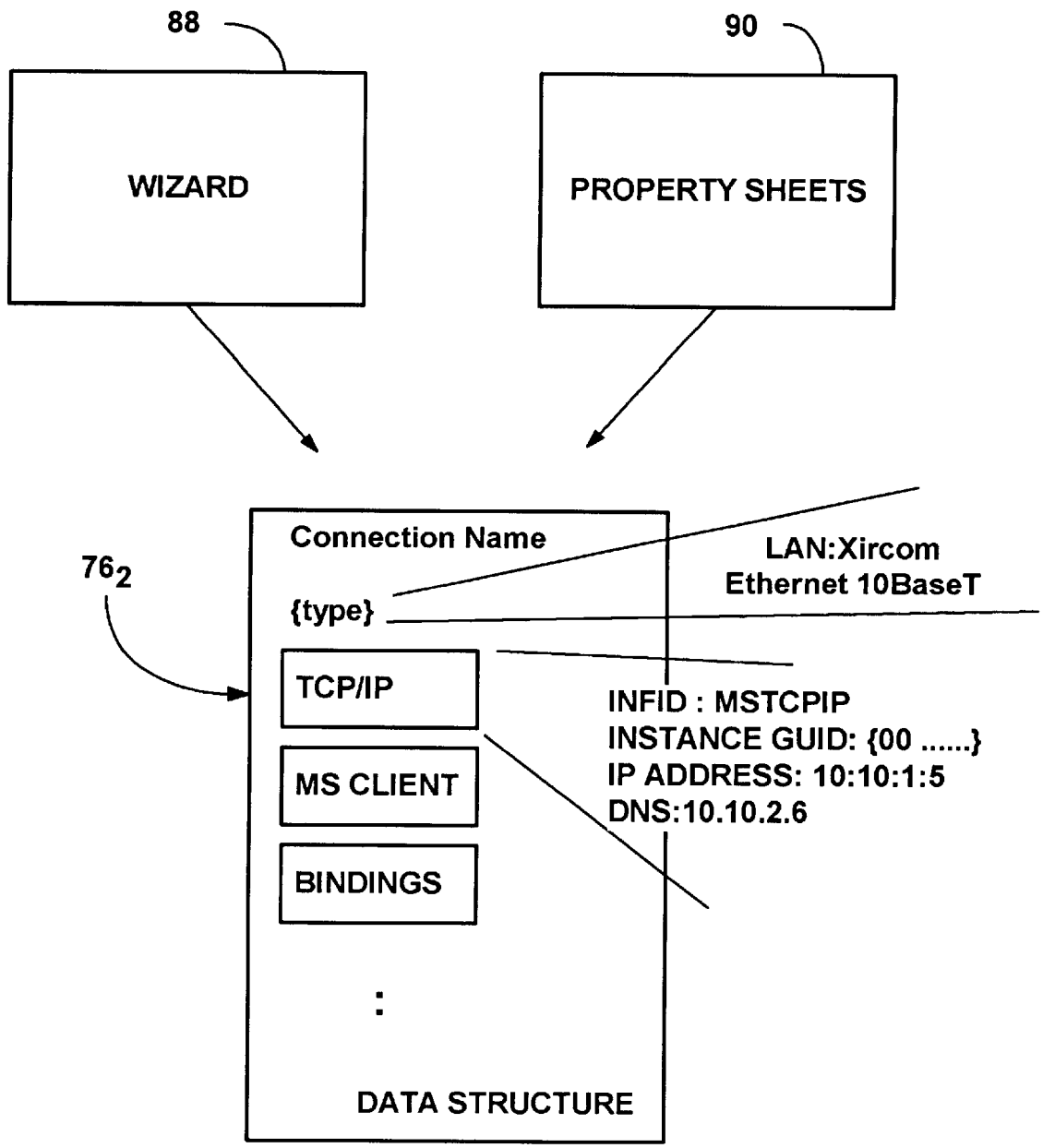
FIG. 4 is a representation of a connection object having configuration information therein for connecting to a network in accordance with one aspect of the present invention.

As best shown in FIG. 4, the various networking information may be obtained from a user interface, such as a user interface presented as a wizard process 88 and/or one or more property sheets 90 having modifiable values thereon. The wizard process offers the options set forth in the following table:

| OPTION | DESCRIPTION |
| --- | --- |
| Connect using phone line | Create a secure connection to a remote network, using a modem or other remote networking method. |
| Connect securely through a public network | Create a secure connection through a network you are already connected to |
| Connect to the Internet | Create a connection to the Internet using a modem, LAN, or other method. |
| Connect to the local network | Create a connection to your network, using Ethernet or other permanent method. |
| Connect my computer directly to another | Create a connection to another computer using your serial COM port, a modem, or other method. |
| Let someone connect to my computer | Let someone call your computer using your modem or the Internet. |

In addition to wizards and property sheets, other methods of obtaining connection information for a particular network are feasible and may also be used. Regardless of how the information is obtained, the connection object includes information referencing a particular user connection to a particular network. For example, as shown in FIG. 4, the connection object $76_2$ identifies that the connection uses a certain make of LAN network adapter card 64 along with the TCP/IP protocol 72, and connects as a Microsoft client 70. Parameter data and binding information 86 is also stored therein, (e.g., the LAN adapter 64 is bound to the TCP/IP protocol 72). Note that each piece of information in a connection object may itself comprise an object and/or parameter values associated therewith.

The connection objects $76_1$–$76_n$ preferably comprise a data structure having methods and data encapsulated therein. Basic methods common to the connection objects include connecting to a network via the configuration information in the object, or disconnecting if connected. Note that to connect to a network, the appropriate configuration information is applied to the system's running configuration as described below.

Five classes of objects are presently defined, including LAN, dial-up, direct connection, virtual private network and inbound classes. Virtual private networks refer to the secure connection to a private network through a public network such as the Internet. As a significant benefit, additional methods may include rules for each class of object, which can hide many of the often-confused settings from a user. For example, Netware client software 66 has to be used with the IPX protocol 68, and the methods for the object classes that allow Netware (e.g., LAN or dial-up) can prevent the user from selecting any conflicting components. Moreover, component binding is particularly troublesome for users, and can thus be substantially hidden from the user.

In accordance with one aspect of the present invention, because a number of connection objects can exist independently on a system, each connection object maintains unique elements of a network configuration independently from any current running configuration. As a result, when the user desires to change the network configuration, the user may either select a new connection object or modify the properties of another connection object, and then apply that connection object to the currently running configuration. As is known, (such as in Windows NT and Windows 95-based systems), the running configuration corresponds to whatever networking component information is present within a registry of the system. Thus, in keeping with the present invention, to connect to another network, the component and parameter information in a connection object is applied to the running configuration by writing the information therein into the registry. Ordinarily, the computer does not have to be restarted to change a network configuration.

Moreover, connection object information can be saved to a non-volatile storage, (e.g., the hard drive 27 of FIG. 1). More precisely, a uniquely named file including the information (e.g., class and parameter data) necessary to instantiate a connection object may be saved in a file system or the like for each connection object. For purposes of simplicity herein, however, the connection objects themselves may be thought of as being named. Moreover, there is no intent to limit the present invention to requiring objects and/or files. Rather, the invention contemplates using any collection of data maintained such that the configuration information for one of the networks can be created, stored, retrieved, operated on and/or applied independently from the configuration information for other networks.

Figure 5:
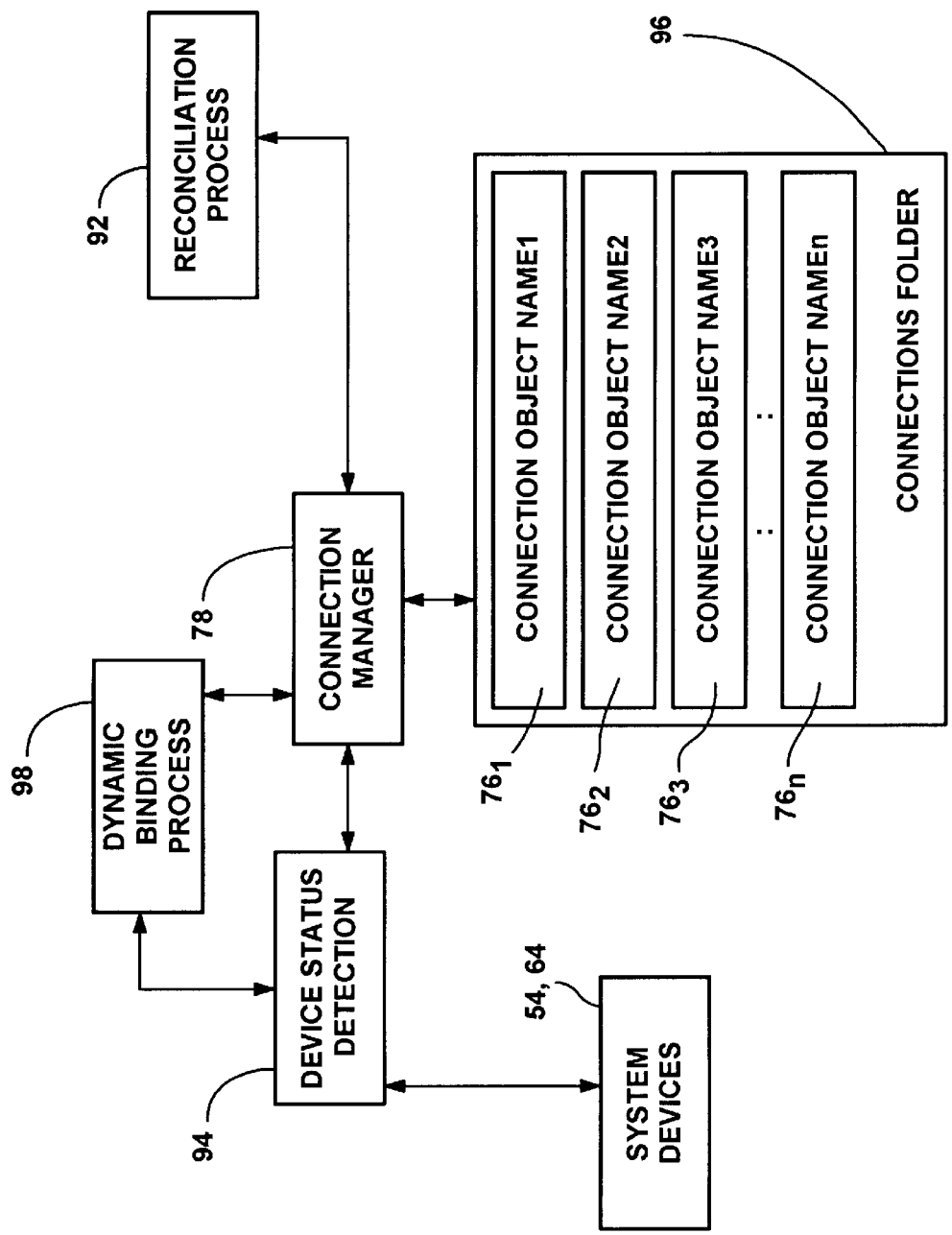
FIG. 5 is a block diagram representing various components for operating on the connection objects of the present invention.
Figure 6:
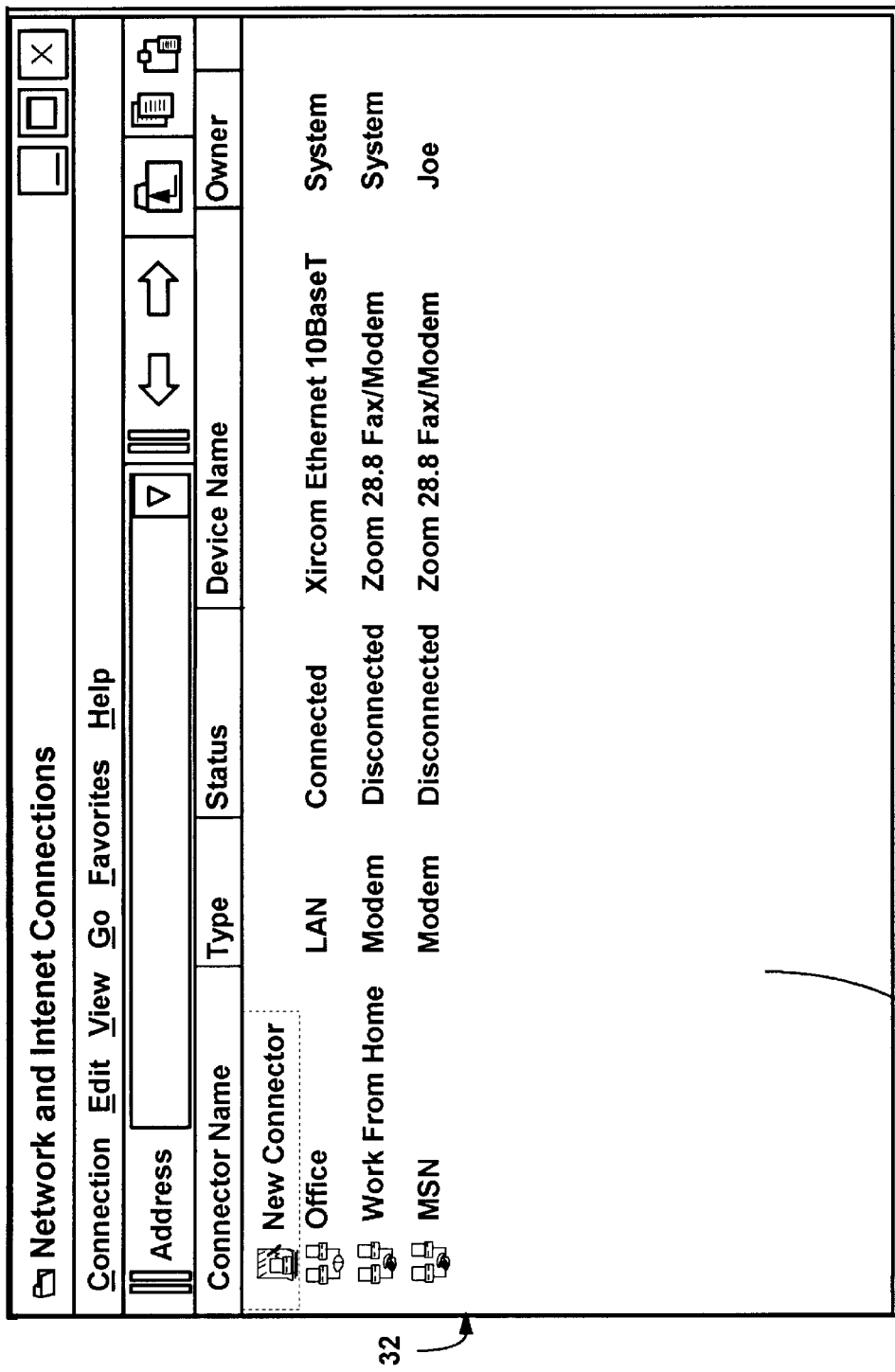
FIG. 6 is a representation of a user interface presented to a user through a connections folder.

To facilitate the use of the connection objects, as shown in FIG. 5, a connection manager 78 interfaces with the user through a folder 96 and manages the connection objects $76_1$–$76_n$. Network connections generally appear as icons in the connection folder 96 (as shown in FIG. 6, an exemplary view including the connection objects' details). The connections folder 96 thus displays the set of connection objects, each uniquely named by the user either during its original creation (via the new connection Wizard) or after renaming. By way of example, Connection 1 ($76_1$) might be named "MSN" by the user to represent the "RAS 74-TCP/IP 72-modem 54-Internet 62" connection option of FIG. 2, while Connection 2 ($76_2$) might be named "Office" and represent the "Microsoft networking client 70-TCP/IP 72-network card 64-corporate network 60" connection of FIG. 2.

In summary, to accomplish the networking configuration for each network, the user runs a wizard 88 or modifies property sheets 90 to configure a connection to support the desired services and communication method. The computer's networking configurations are thus reflected in its set of connection objects $76_1$–$76_n$ and their properties. Each connection object $76_1$–$76_n$ represents the ability for the computer to connect to a single network, irrespective of any other connection objects residing or running on the computer.

In accordance with another aspect of the present invention, each connection object $76_1$–$76_n$ presents a heterogeneous user interface regardless of the type of connection (e.g., WAN or LAN). To this end, the objects employ heterogeneous connectoids as user interface objects that act as proxies and entry points to their underlying connection methods. The connectoids enable the connection objects to be stored, accessed, manipulated, transferred, created and destroyed in the same ways, regardless of the kind of networking they support.

Similarly, the above-identified connection object classes exist to meet the functional and user interface requirements. Each connection object supports the same set of basic methods, conforms to the same transfer model (i.e., file transfers), and its properties share certain attributes.

Figure 7:
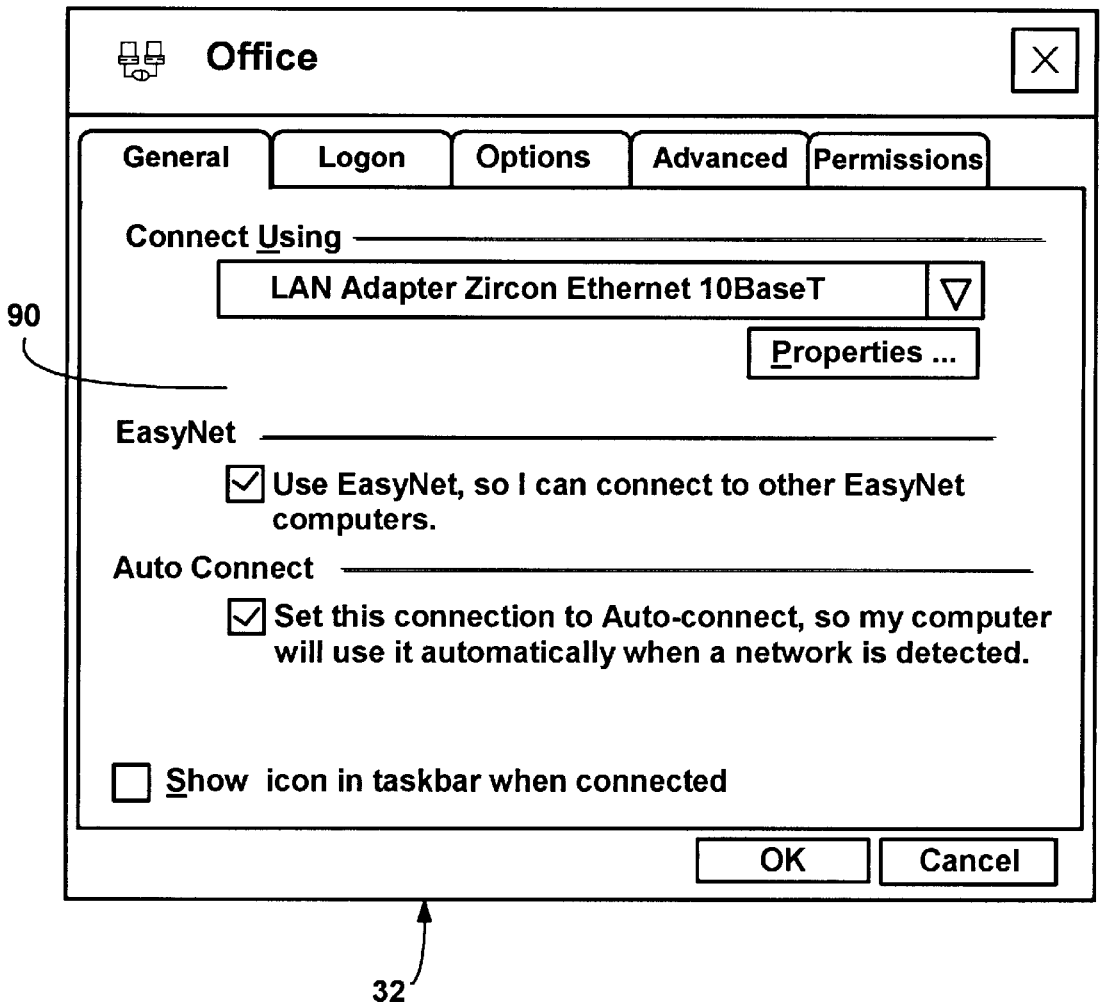
FIG. 7 is a representation of a user interface for receiving configuration information from a user through a property sheet.

For example, each connection in the system has a corresponding connection object in the connections folder. The connection object is the primary user entry-point into the configuration properties and methods for each connection. As shown in the property sheet 90 of FIG. 7, each connection also has a "General" tab that contains the most basic parameters required for it to connect. The purpose of the General tab is to communicate and provide access to the connection's fundamental properties, i.e., to expose the properties without which a connection would not occur. Examples of General tab parameters include a device/medium (all method classes), phone number (dial-up), and IP address/hostname (tunnel).

A connection object also presents an "Options" tab in its property sheet 90. The "Options" tab provides user control over the high level features that are bound in that connection. In the Options tab, clients and services are pre-installed but not necessarily turned on for a given connection.

If connections need to expose somewhat technical properties, such as protocol configuration, encryption, authentication, and so on, an "Advanced" tab provides a means of consistency between connection interfaces. The Advanced tab is where protocol configuration resides, as does other network stack configuration.

Lastly, a "Permissions" tab gives administrators and other power-users the ability to designate the rights that users have for a connection and otherwise manage security for connections.

In keeping with the present invention, a feature is provided to automatically reconcile the information stored in the connection objects with respect to the actual device or devices available on a given machine. In general, the purpose of device reconciliation is to maintain device independence while simultaneously preserving device references based upon user requirements.

By way of example, if a number of computers administered by a system administrator have a certain make of LAN adapter 53, the administrator may wish to deploy a corresponding connection object that will use that adapter 53. At the same time, if a particular system instead uses another make of LAN adapter, reconciliation will automatically attempt to use the other make.

In accomplishing reconciliation, the system utilizes globally unique identifiers (GUIDs). As is known, GUIDs are 128-bit integer values that are used to assign world-wide unique identifiers for COM interfaces and CoClasses. GUIDs can be mapped to instances of the GUID class.

To reconcile, the system provides a reconciliation process 92 (FIG. 5) which analyzes the device instance GUIDs and device media types stored when connections are applied. Storing GUIDs for the devices used in a connection ensures that the next time the connection is activated, its operation will be identical with the previous connected state, unless device hardware has been changed on the system. This also ensures that, given a hardware profile, any reconciliation procedures required to activate the connection, whether they involve querying the user, will be performed only once.

Storing the media type enables the system to target devices that are likely to be compatible with the connection's configuration, even though the device may be a different make, or have different capabilities. Examples of media type include Ethernet, Fast Ethernet, Token Ring, FDDI, ATM, ISDN, Modem, Serial Port and Parallel Port.

In general, two stages of reconciliation are provided to accomplish two distinct purposes. A first purpose is to indicate when a connection is unavailable as a result of the system lacking of a compatible device. A second purpose is to reset a connection's device after determining that the connection's original device is not available.

When a compatible device is unavailable, as result of such devices being removed or on installed from the system, the unavailability is detected so as to indicate to the user through the connection folder, taskbar, or other user interface that the connection is not available for use. For example, when a networking device exists in a user's docking station, and the portable computer is undocked (and no other compatible device is available), the connection object indicates that there is no possibility of its being used.

Alternatively, when a connection's original device is not present, but a compatible device exists, reconciliation offers the possibility of resetting the device specified by the connection to the newly detected device. For example, when a user replaces the modem or LAN card in the computer, any connection that references the original device provides for resetting the original reference that of the newly available device. As another example, when a system administrator deploys a connection object to be used on multiple systems, the connection object provides for resetting a device referenced in the distributed connection object to a device reference which is compatible to one in the end-user's system.

One event that triggers reconciliation is when a connection object is placed in the connections folder 96. For example, a system administrator may distribute a new connections object to various system users, i.e., a user obtains a connection object from a different machine in order to use the configuration information therein on the user's machine.

Figure 8:
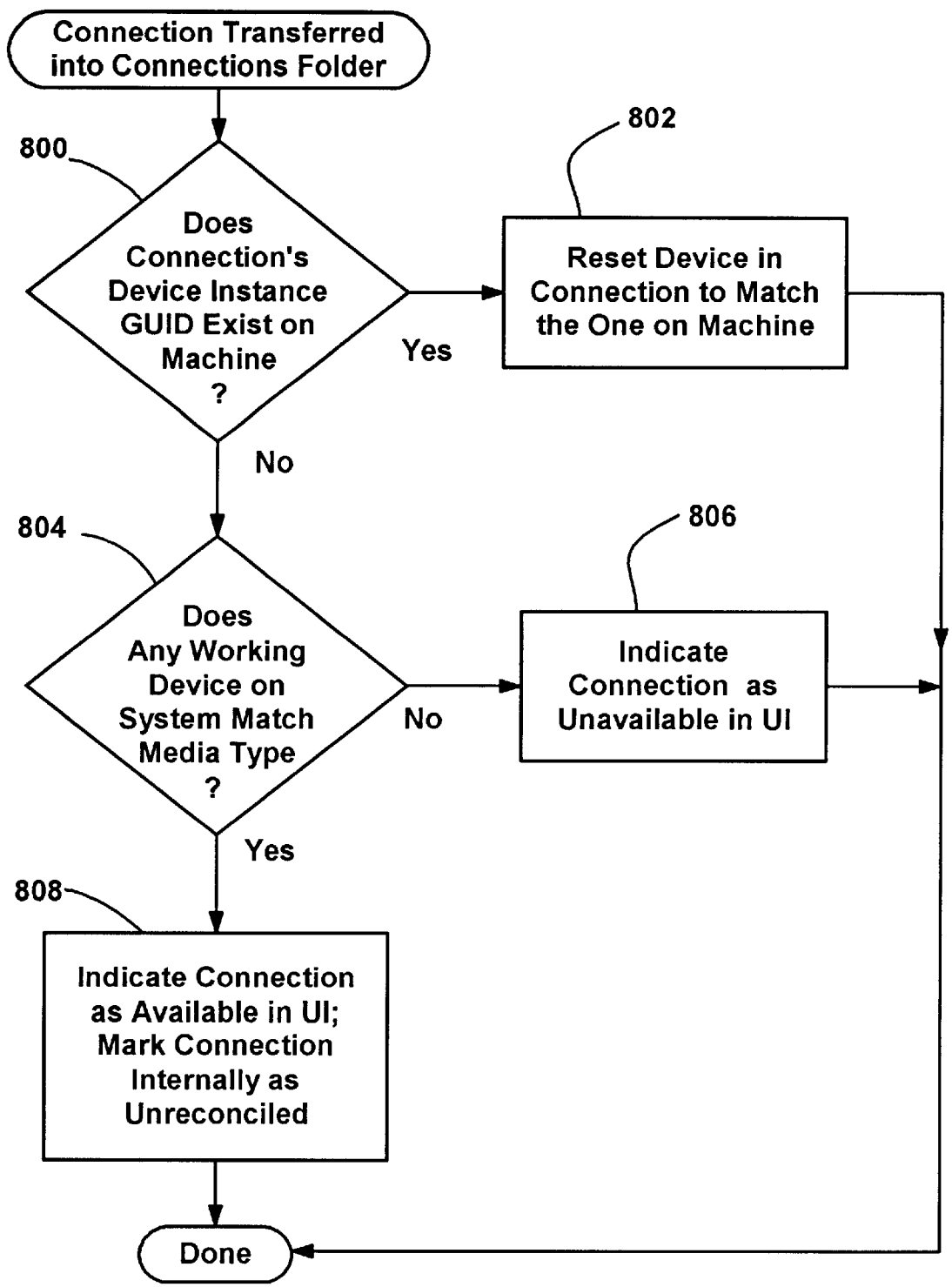
FIG. 8 is a flow diagram representing a reconciliation process that takes place when a connection is transferred into the connections folder.

FIG. 8 generally represents the steps taken by the reconciliation process 92 when a connection object is detected as having been transferred into the connections folder. First, at step 800, a test is performed to determine whether the connection's device (GUID) is recognized as one that already exists on the current system 20. Note that typically, device status information is automatically available to the system via a device status detection means 94, such as by known plug-and-play technology. If the device is present, step 800 branches to step 802 wherein the device information maintained within the connection object is set to match the device on the machine (which ordinarily does not change, although any updating is possible).

However, if the device instance GUID does not exist on the machine, a test is performed at step 804 determine whether any working device on the system matches (i.e., is compatible with) the media type. If there is not any match, step 804 branches to step 806 wherein the user interface is modified as necessary to indicate that this connection is unavailable. Conversely, if there is a match, step 804 branches to step 808 wherein the user interface indicates the connection is available, but also internally marks that the connection is unreconciled. For example, if a different Ethernet card is present on the device, step 804 detects the match, indicates that the connection is available, but internally marks the connection as unreconciled. Unreconciled connections can be used to query the user for confirmation or to obtain further information.

Figure 9:
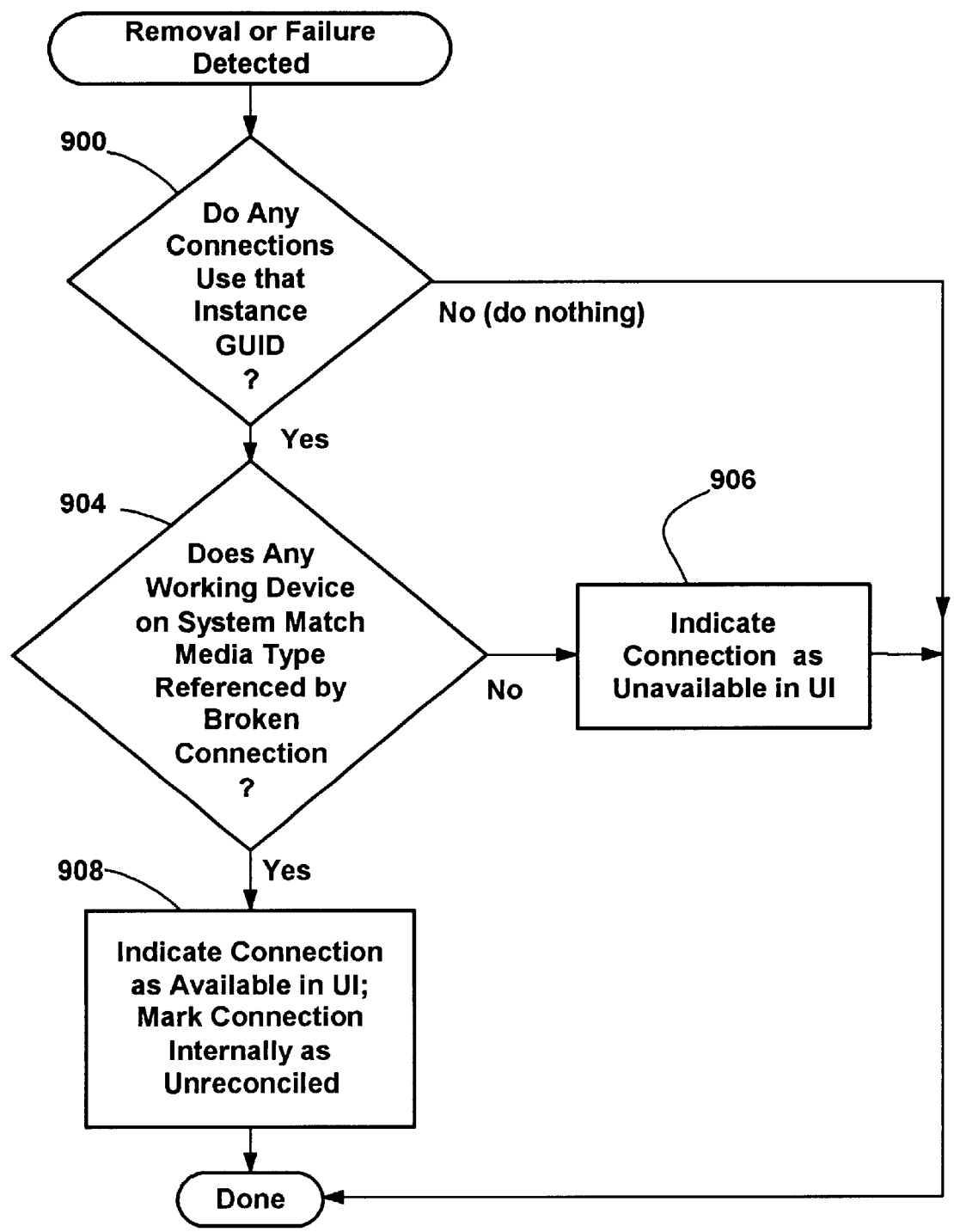
FIG. 9 is a flow diagram generally representing a reconciliation process that takes place when a system device is detected as having been removed or having failed.

FIG. 9 shows the general steps taken by the reconciliation process 92 when a device which may be specified in a connection object is disabled, (is removed or fails), and that event is detected by the device status detection component (e.g., plug and play) 94. At step 900, a test is performed to determine if any of the connections use that device instance as identified in the GUID field within the connection object. If not, step 900 ends the process as no action need be taken to reflect the disabled device.

If, however, a connection does use that instance GUID, step 900 branches to step 904 wherein the media type in the connection object is compared against the working devices on the system to see if a compatible device exists. If not, step 904 branches to step 906 where the connection object indicates to the user that the connection is unavailable, and the reconciliation process ends. Conversely, if a compatible match is found, step 904 branches to step 908 where the connection is indicated as being available to the user, but is internally marked as unreconciled.

Figure 10:
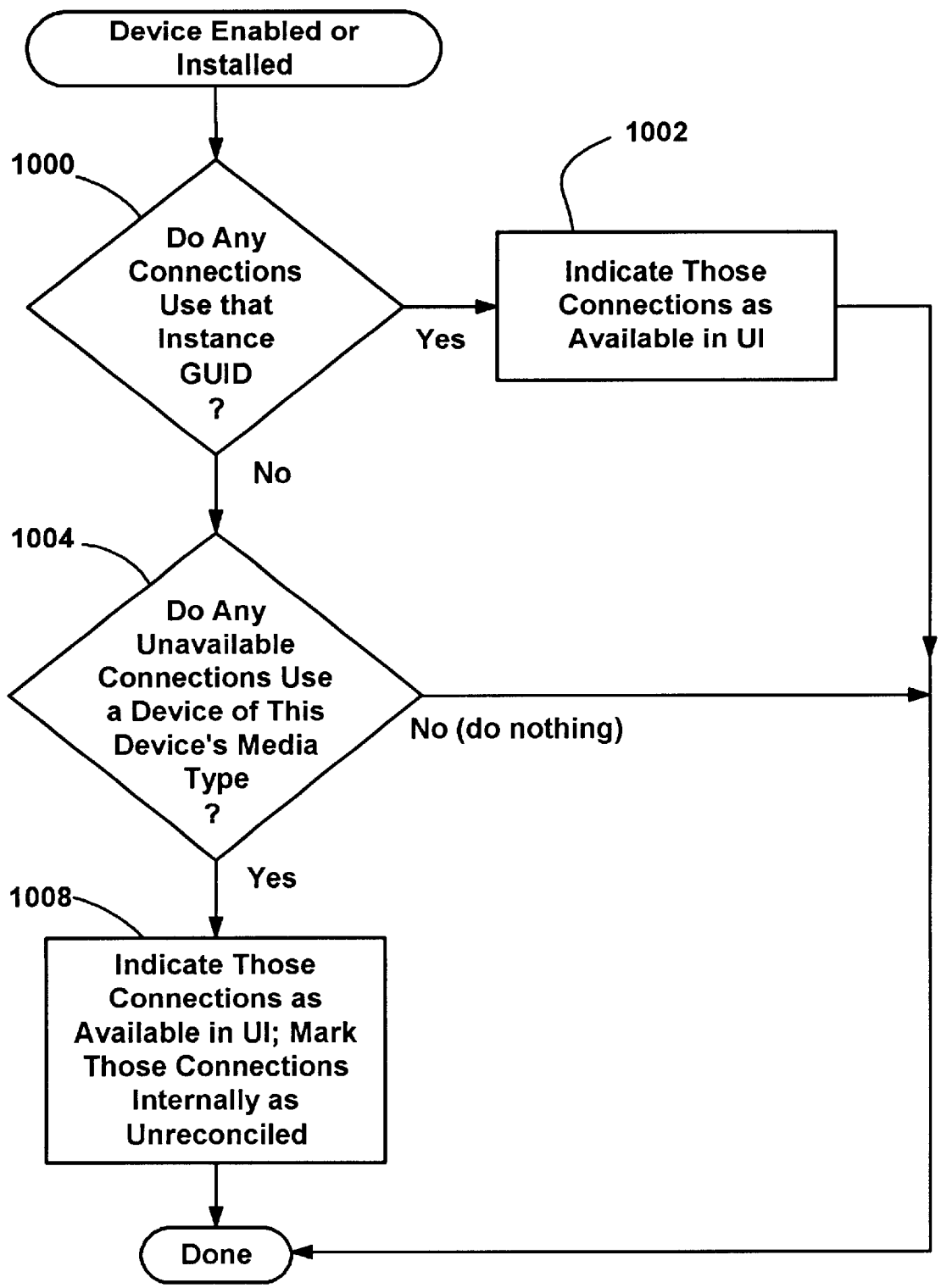
FIG. 10 is a flow diagram generally representing a reconciliation process that takes place when a system device is detected as having been enabled or installed.

FIG. 10 shows the general steps taken by the reconciliation process 92 when a device is detected (by the device status detection component 94) as being newly enabled or installed in the system. Steps 1000–1002 scan the various connection objects in the connections folder 96 to determine if any specify an instance GUID that is the same as that of the device, and if so, indicate that those connections are available. Similarly, steps 1004–1008 scan those connections which are marked as unavailable to determine if any use the device of the same the media type as the installed or enabled device, whereby those of the same type are indicated as available to the user and marked internally as unreconciled. In this manner, appropriate connection objects are updated whenever a newly available device is detected.

Figure 11:
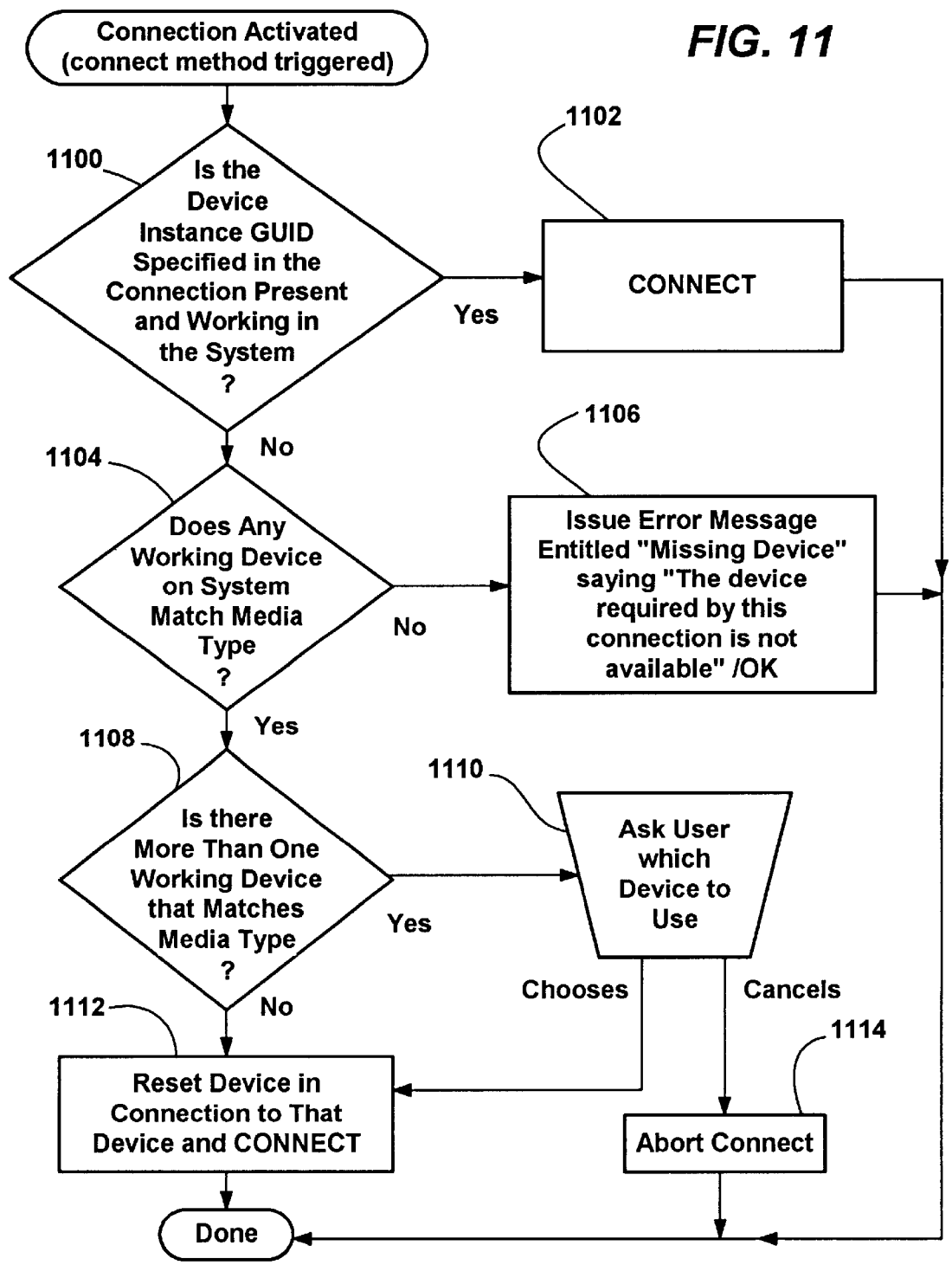
FIG. 11 is a flow diagram generally representing a reconciliation process that takes place prior to a connection being activated.

FIG. 11 shows the reconciliation steps taken when the connection is activated (i.e., when the connect method is triggered). At step 1100, the device instance GUID specified in the connection is checked to ascertain whether such a device is present and working in the system. If so, the process branches to step 1102 and the connection is made, after which the reconciliation process ends. If not, step 1100 branches to step 1104 wherein other devices on the system are checked to determine if any match the media type identified in the connection object. If no match is found, step 1106 issues an appropriate error message and the process ends (following user acknowledgment or the like).

However, if at step 1104 a device did match, a test is performed at step 1108 to determine if more than one working device matches the media type identified in the connection object. If so, step 1110 is performed to query the user as to which device to use. The user can either choose a device or cancel the connection (in which event the connection is aborted at step 1114). Whether by user selection or if only one such device was present, once only one specified device matches the media type, step 1112 is executed whereby the device in the connection is reset to the matching device and a connection is made.

Figure 12:
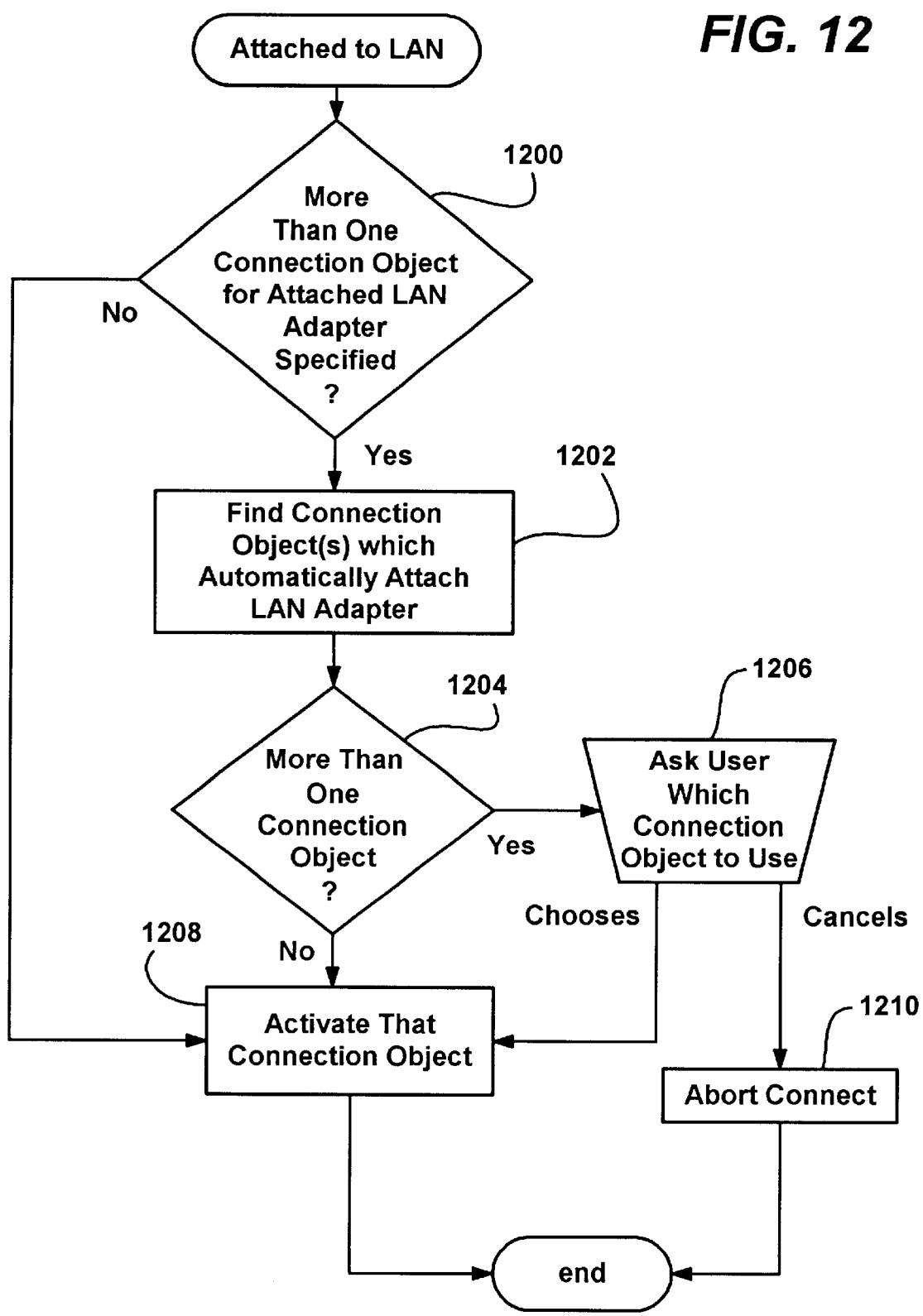
FIG. 12 is a flow diagram generally representing a reconciliation process that takes place when more than one connection object specifies an attached LAN adapter.

FIG. 12 shows a network reconciliation process that occurs when a system is attached to a LAN and a connection is requested. At step 1200, a check is made to determine whether more than one connection object for the attached LAN adapter is specified. If not, step 1200 branches to step 1208 wherein the one connection object that does specified the attached LAN adapter is activated.

If, however, more than one adapter is specified, step 1200 branches to step 1202 to find one or more connection objects which will automatically attach the LAN adapter when applied. If there is only one specified for auto-attachment, as recognized by step 1204, that connection object will be activated at step 1208. Alternatively, if there is more than one at step 1204, step 1206 queries the user as to which connection object to use. If the user chooses one, that connection object is activated at step 1208, otherwise the user cancels and connection is aborted at step 1210.

Lastly, the present invention provides for dynamic network component binding. This provides the ability to reconfigure the running network components and their configuration sometime after system start, by providing the ability to apply connection object and their corresponding network configuration flexibly and in various combinations without restarting the computer. To this end, when a connection object has been selected for applying to the running configuration, a dynamic network component binding process 98 walks through the various components identified in the selected connection object to see if those components are available to the system. For example, if a particular net card is identified, the process checks to see whether the card (or a compatible card) is present on the system. Similarly, if an instance of a protocol and/or client software is identified, the process will determine if the instance is loaded, and if not, will load it (if possible) and start the instance. Also, bindings will be dynamically chosen to link the components. In this manner, a selected configuration can be applied with minimal user interaction.

As can be seen from the foregoing detailed description, there is provided a system and method that simplifies network configuration, replacing the static network configuration model with a model of networking that is connection-based. The method and system enable the user to configure a connection to a selected network in a substantially less complex manner, and provide a user interface that presents differing networking methods in a heterogeneous way. The method and system allow a user to easily alter a network configuration of a computer with less chance of error, and automatically reconciles selected configuration options with actual components available on a particular computer system.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. A method of configuring a computer for connecting to a plurality of different networks, comprising;

providing a user interface;

receiving user input via the user interface identifying a first network and first configuration information corresponding thereto, the first configuration information obtained independent of a connection to one of the different networks;

writing the first configuration information for the first network into a first data structure in a non-volatile storage;

receiving user input identifying a second network and second configuration information corresponding thereto, the second configuration information obtained independent of a connection to one of the different networks;

writing the second configuration information for the second network into a second data structure in the non-volatile storage, wherein the first data structure and the second data structure each comprise an independent object including methods and a self-contained description of a networking configuration sufficient to connect to one of the different networks;

receiving user input identifying the first data structure;

extracting the configuration information from the first data structure, and connecting to the first network by applying the configuration information to a running configuration of the computer via at least one of the methods.

2. The method of claim 1 in wherein writing the configuration information into a first data structure includes writing object class information thereto.

3. The method of claim 1 wherein the first and second data structures are maintained in separate files, and further comprising associating a unique name with each of the files.

4. The method of claim 1 wherein receiving user input includes receiving information indicating that the network is a local area network.

5. The method of claim 1 wherein receiving user input includes receiving information indicating that the network is a wide area network.

6. The method of claim 1 wherein receiving user input includes receiving information indicating that the network is a virtual private.

7. The method of claim 1 wherein receiving user input includes receiving information indicating that the network is a direct connection to another computer.

8. The method of claim 1 wherein receiving user input includes receiving information identifying a particular system device.

9. The method of claim 8 further comprising detecting a device in the computer corresponding to the particular system device identified.

10. The method of claim 8 further comprising detecting at least one device in the computer, comparing the device with the particular system device identified, and if there is not an exact match, selecting a compatible device.

11. A computer-readable medium having computer-executable instructions for performing the method of claim 1.

12. A method of connecting a computer to one of a plurality of different networks, comprising:
    obtaining configuration information about each of the different networks, the configuration information for each network obtained independent of a connection thereto, the configuration information for each network identifying a device media type operative to connect to that network;
    maintaining the configuration information for each network in a data structure associated with that network, the data structure being an object that is independent of other data structures associated with other networks and including methods and data therein;
    receiving a request from a user to connect to a particular one of the networks;
    retrieving the configuration information from the data structure for that network;
    setting network connection parameter values based on the retrieved configuration information, including executing at least one method of the object; and
    connecting to the network via the parameter values.

13. The method of claim 12 wherein the configuration information includes data identifying a protocol, and the device media type includes a device adapter.

14. The method of claim 12 wherein the configuration information includes data identifying a device, and further comprising reconciling the device information with a device enabled in the system.

15. The method of claim 14 wherein reconciling includes locating a compatible device in the system.

16. The method of claim 14 wherein reconciling includes detecting a newly enabled or installed device in the system.

17. A computer-readable medium having computer-executable instructions for performing the method of claim 12.

18. A system for configuring a computer system to connect to a plurality of different networks, comprising, a user interface for obtaining configuration information about each of the different networks, the configuration information for each network obtained independent of a connection thereto, a non-volatile storage, means for storing the configuration information for each network in the non-volatile storage as an object including methods and data such that the configuration information for one of the networks can be retrieved independently from the configuration information for any other network via a method of the object, means for selecting a network as a selected network, means for retrieving the configuration information stored for the selected network, and at least one method in the object for applying the configuration information to connect the computer system to the selected network.

19. The system of claim 18 wherein the means for storing the configuration information includes a file system.

20. The system of claim 18 wherein the means for storing the configuration information includes a file system, and wherein the means for retrieving the configuration information includes means for receiving a filename.

21. The system of claim 18 wherein the configuration information includes device information, and further comprising means for reconciling the device information with a device in the system.

22. The system of claim 21 wherein the device information includes a globally unique identifier.

23. The system of claim 21 wherein the device information includes media type identification.

24. A computer-readable medium of a local computer having stored therein a plurality of data structures, each data structure including configuration information for configuring the local computer to connect to a network, each data structure comprising;
    a first data field associated with the data structure to uniquely identify the data structure relative to other data structures on the medium,
    a second data field including data representing a unique identifier of a device instance for connecting the local computer to a network independent of an existing connection to the network,
    a third data field data representing a device media type corresponding to the device instance; and
    executable code including at least one method that connects the local computer system to the network based on the configuration information.

25. The computer-readable medium of claim 24 wherein the first data field corresponds to a filename.

26. The computer-readable medium of claim 24 wherein the second data field includes a globally unique identifier.

27. The computer-readable medium of claim 24 wherein the device media type identifies a local area network card.

28. The computer-readable medium of claim 24 when the device media type identifies a modem.

29. The computer-readable medium of claim 24 wherein each data structure further comprises a method for connecting the local computer to a network.

* * * * *